Feb. 27, 1962 G. B. HERZOG 3,023,319

INFORMATION HANDLING DEVICE

Filed April 14, 1960 3 Sheets-Sheet 1

INVENTOR.
Gerald B. Herzog
BY John V. Regan
Attorney

Feb. 27, 1962 G. B. HERZOG 3,023,319

INFORMATION HANDLING DEVICE

Filed April 14, 1960 3 Sheets-Sheet 2

INVENTOR.
Gerald B. Herzog
BY John V. Regan
Attorney

Feb. 27, 1962 G. B. HERZOG 3,023,319

INFORMATION HANDLING DEVICE

Filed April 14, 1960 3 Sheets-Sheet 3

INVENTOR.
Gerald B. Herzog
BY John V. Regan
Attorney

United States Patent Office 3,023,319

Patented Feb. 27, 1962

3,023,319

INFORMATION HANDLING DEVICE

Gerald Bernard Herzog, Princeton, N.J., assignor to Radio Corporation of America, a corporation of Delaware Filed Apr. 14, 1960, Ser. No. 22,143
18 Claims. (Cl. 307—88)

This invention relates to information handling systems and, more particularly, to novel gates and shift circuits suitable for use in a carrier-type information handling system.

It is desirable in certain information handling systems, such as digital computers, that the systems operate at high speed. The maximum information handling rate of conventional baseband (or pulse type) systems is limited to about 50 megacycles by the gain-bandwith product of available pulse type amplifiers. It has been suggested, therefore, that a carrier or passband system be used wherein information is represented by different phases of R.F. at the same frequency.

The ability of a parametric phase locked oscillator (PLO) to amplify, detect, and store binary digital signals in the form of two distinct and opposite phases of carrier (phase script notation) makes the PLO a desirable component for a carrier-type information handling system. The PLO, however, is a two terminal device, and means must be provided for controlling the timing and direction of information flow. Three phase clocking techniques have been proposed for this purpose and are described, for example, in an article entitled "Parametric Phase-Locked Oscillator—Characteristics and Applications to Digital Systems," in the September 1959 issue of the "IRE Transactions on Electronic Computers," at pages 282–283, and in other publications.

However, circuits which unconditionally shift information during each clock period do not satisfy the requirements of true shift circuits, such as shift registers, ring counters and the like, which are used as components in an information handling system. The problem of undesirable shifting may be overcome by providing gates between successive PLO stages of the shift circuit. The gates must, of course, be capable of passing selectively R.F. signals of both information phases. Moreover, it is desirable that the control signal for the gate be a compatible R.F. phase signal.

Accordingly, it is an object of the invention to provide a gate circuit suitable for use in a carrier-type system.

It is another object of the invention to provide a gate which is actuated by an R.F. control signal.

It is still another object of the invention to provide means for gating information expressed in R.F. phase script notation, which gating means may be controlled selectively by a compatible R.F. signal.

It is yet another object of the invention to provide novel shift circuits employing PLO's.

Still another object of the invention is to provide a novel PLO shift circuit which does not shift information unconditionally during each clock period.

A further object of the invention is to provide a novel PLO shift circuit which is energized by a three phase clock, but which shifts information only in response to a control signal which is compatible with the information signals.

According to the present invention, the cascaded PLO's of a clocked shifting circuit are coupled by way of threshold gates, which may take the form of expanders wherein small signals are attenuated greatly while large signals are passed with little attenuation. A portion of each PLO output is reflected back in phase after a suitable delay to provide a signal for locking the PLO during the next clock period when shifting is not desired. The PLO output to the expander is a small signal which is so attenuated in the expander that it reaches the adjoining PLO with insufficient amplitude to overpower the reflected locking signal in the adjoining PLO. To shift upon command, an R.F. signal at the carrier frequency is applied to the expander 90° out of phase with the input from the PLO and added vectorially thereto. The vector sum is of such amplitude that it passes through the expander with little attenuation, again because of the expander characteristics, and causes the oscillations of the adjoining PLO to lock at the stable phase closest to the expander output.

In the following drawing, like reference characters refer to like components, and:

A parametric phase locked oscillator consists essentially of a tank circuit tuned to a natural resonant frequency $f_n$. If one of the reactances of the tank circuit is varied at a frequency $f'$ by an energizing source, often referred to as the "pump," an effective negative resistance occurs at a frequency $f$ where $f=(n/2)f'$, where $n$ equals 1, 2, 3, etc. If $f$ is approximately equal to $f_n$, the circuit will oscillate parametrically at the frequency $f$ and the oscillations will lock in phase with the pump. The PLO is adjusted to oscillate at one half the pump frequency in a binary system, whereby the oscillations are sustained in either of two distinct and stable phases. The two phases are 180° apart at the same frequency and may represent, respectively, binary "one" and binary "zero." Once the PLO starts to oscillate in either of the two stable phases, it continues to do so until forcibly stopped or until the pump is interrupted. The PLO may be steered into the desired phase of oscillation by applying a small locking signal of frequency $f$ to the PLO during the time the oscillation first starts to build up. In general, the oscillations build up at the stable phase which is closest to that of the locking signal. A more detailed description of the physical and operating properties of a PLO are given in the aforementioned article.

Figures 1, 2, 4:
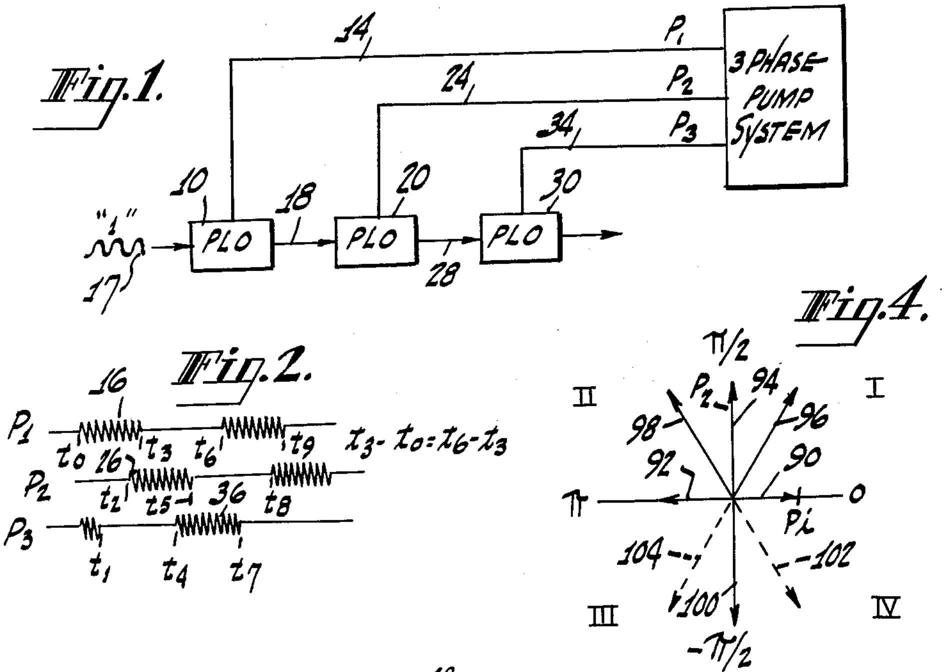
FIGURE 1 is a block diagram of a three stage PLO system illustrating unconditional shifting of information.
FIGURE 2 is a timing diagram of the modulated outputs of the pump system of FIGURE 1.
FIGURE 4 is a graph of signal inputs to the FIGURE 3 gate.

The problem of undesirable shifting of information in a shift circuit of a clocked carrier system may be seen more clearly by reference to FIGURE 1. A three phase pump system 12 supplies energizing signals in time ordered sequence to three PLO's 10, 20, 30 by way of lines 14, 24, 34, respectively. The pump 12 outputs $P_1$, $P_2$ and $P_3$ are illustrated graphically in FIGURE 2. The pump 12 output $P_1$ to the first PLO 10, for example, is a burst 16 of R.F. frequency $f'$ applied during the time period $t_0$ to $t_3$. This burst 16 is followed by a quiescent period of equal duration which lasts from $t_3$ to $t_6$. Another burst of R.F. follows the quiescent period. The PLO 10 oscillates when the R.F. signals 16 are applied, and is quiescent during the period between bursts. The other pump 12 outputs $P_2$ and $P_3$ are similar to $P_1$ but are displaced timewise. More specifically, the $P_2$ output lags the $P_1$ output by one-third of a clock period, and the $P_3$ output lags the $P_2$ output by one-third of a clock period. It is to be noted that the periods of pump 12 energization overlap one another.

Oscillations start to build up in the first PLO 10 at a time $t_0$ in response to the pump signals 16. An information input signal 17 of phase "one" is coupled to the PLO 10 at a time preceding $t_0$ and causes the PLO 10 to oscillate in phase "one" during the period $t_0$ to $t_3$. Output from the PLO 10 is continuously applied over line 18 to the second PLO 20 during the period $t_0$ to $t_3$. Pump signals 26 are applied over line 24 to the second PLO 20 during the period $t_2$ to $t_5$. The output of the first PLO 10 serves as a locking signal for the second PLO 20 and causes the oscillations therein to build up in phase "one" starting at time $t_2$. The pump signals 14 to the first PLO 10 are interrupted at $t_3$, and the first PLO then remains quiescent until again energized at $t_6$.

Pump signals 36 are applied over line 34 to the third PLO 30 during the period $t_4$ to $t_7$. The output of the second PLO 20 is fed to the third PLO 30 over line 28 and causes the oscillations in the third PLO 30 to build up in phase "one" at $t_4$. The pump signals 24 to the second PLO 20 are interrupted at $t_5$. Pump signals 16 are again applied to the first PLO 10 at $t_6$. The second PLO 20 is not oscillating at this time and therefore does not apply a locking signal to the first PLO 10.

It is thus seen that the clocked pump technique provides means for controlling the direction of information flow. However, as may be seen also in FIGURE 1, the information is shifted three stages during each complete clock cycle because a locking signal from a preceding PLO is always applied to a PLO when oscillations are building up therein. Such unconditional shifting is desirable in many portions of an information handling system, but is undesirable in certain other portions of the system, particularly, for example, in shift circuits such as shift registers where it may be desired to store information for any designated period of time. Such undesirable propagation of information may be prevented by connecting gates between successive PLO stages of a shift circuit. The gates, of course, must be capable of passing both opposite phases of parametric oscillation. Also, it is desirable that the gate be one which may be controlled by an R.F. signal of the carrier frequency, inasmuch as the shift or control signal may be the output of a PLO logic circuit.

Figure 3:
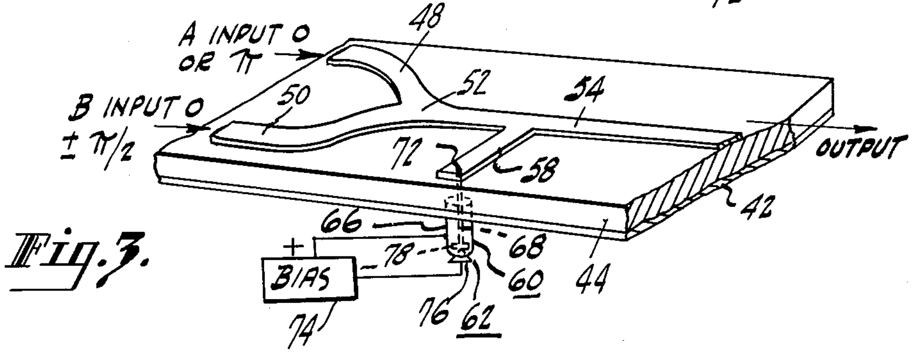
FIGURE 3 is a view, in perspective, of a high frequency R.F. gate according to the invention.

FIGURE 3 is a view, in perspective, of one form of R.F. gate for operation at very high frequencies. The components are of so-called strip transmission line construction. Such transmission lines may be constructed, as illustrated, by employing a metal ground plate 42, which may be copper, applied as a backing on one surface of a suitable dielectric material 44. On the opposite surface of the dielectric 44 are strips of copper which may be established by printed circuit etching or plating techniques. A transmission line is formed between the strip copper and the metal ground plate 42.

A pair of copper strips 48, 50 meet at a junction 52 and join continuously and conductively through a main strip 54. A strip 58 of copper somewhat less than a quarter wavelength long at the R.F. carrier frequency is joined at right angles to the main strip 54. This near quarter wavelength strip 58 is terminated at its outer end by a known type of transducer 60, in which is housed a diode 62, for example a crystal diode. The transducer includes an outer conductor 66 connected to the metal ground plane 42 and an inner conductor 68 which passes through an aperture in the ground plane 42 and dielectric 44 to make connection with the strip 58, as at the point 72. Suitable impedance matching may be provided. The line section 58 and the transducer 60 together act as a quarter wavelength line in shunt with the main line 54. The shunt line and diode 62 operate as an expander when the diode 62 is back-biased.

The diode 62 is back-biased by a voltage source 74, which may be a battery. The positive terminal of the biasing source 74 is connected to the outer conductor 66 of the transducer 60, or to the ground plate 42; the negative terminal is connected to the anode 76 of the diode 62. The cathode 78 is connected to the inner conductor 68. A suitable return path for the D.-C. bias voltage is provided by any suitable means, such as the internal impedance of the pump system (not shown in FIGURE 3).

The R.F. information signals, from a PLO for example, are applied as the A input to the line section 48. These signals may be either binary "zeroes" or "ones" as represented, for example by signals of 0° phase or 180° phase, respectively (zero or $\pi$ radians). The R.F. control signal for opening the gate is the B input applied to the line section 50. As mentioned previously, the control signal has the same frequency as the information signals. This control signal has an amplitude preferably greater than that of the information signal and, in any event, is adjusted to arrive at the junction 52 out of phase with the information signals by 90° ($\pi/2$ radians). These signals are illustrated graphically in FIGURE 4.

Referring now to FIGURE 4, the binary "zero" signal is represented by the line 90 along the 0° axis. The binary "one" signal is represented by the line 92 along the 180° or $\pi$ radian axis. The coordinates may be considered to be either signal amplitude or power. The control signal is represented along the 90° or $\pi/2$ radian axis by the line 94. It will be understood, of course, that the particular signals illustrated in FIGURE 4 are those arriving at the junction 52 of FIGURE 3. The binary "zero" and "one" information signals add vectorially to the control signals in the main transmission line 54, as shown by the resultant vectors 96, 98, respectively. By way of illustration only, the magnitude of the control signal 94 illustrated in FIGURE 4 is selected to provide a vector resultant 96, 98 which has twice the magnitude of either of the "zero" and "one" signals 90, 92, respectively. The control signal may, of course, also have a phase of $-\pi/2$ radians as shown by the line 100 along the $-\pi/2$ axis in FIGURE 4. In the latter event, the vector resultants are the lines 102, 104.

Figure 5:
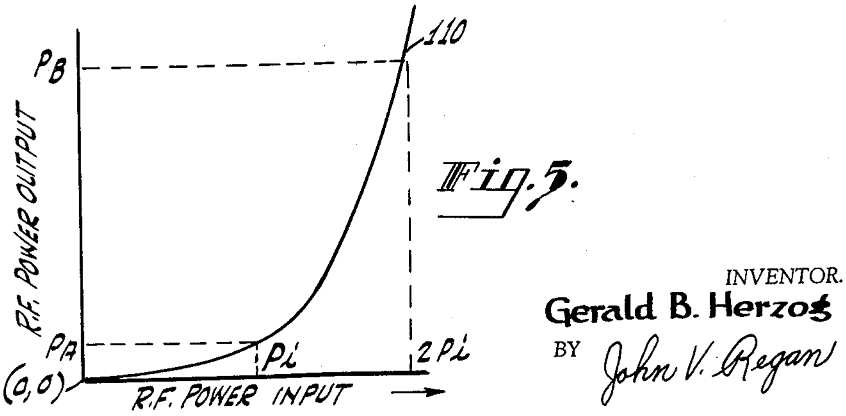
FIGURE 5 is a graph of power output versus power input of the FIGURE 3 gate.

The operation of the gate of FIGURE 3 will now be explained with reference to the graph of FIGURE 5. The R.F. power input to the main transmission line 54 is plotted along the horizontal axis. Power output from the main transmission line 54 is plotted along the vertical axis, although not necessarily in the same units. When the R.F. power input is low, the R.F. voltage at the diode 62 is insufficient to overcome the D.C. bias from source 74 and drive the diode 62 into conduction. Under this condition, the shunt line 58 and transducer 60 operate as a quarter wavelength line open-circuited at its outer end, and appears as a short circuit across the main line 54. Consequently, the R.F. input energy to the main line 54 is reflected by this apparent short circuit and very little, or no R.F. energy reaches the output of the main transmission line 54. This condition is illustrated by the portion of the curve 110 near the intersection (O,O) of the power input and power output axes of FIGURE 5.

When the R.F. power input has a value pi (for example, when an information signal is applied in the absence of a control signal), the R.F. output power has a relatively low value of $P_a$. However, as the R.F. input increases to a value 2 pi (as occurs when the control signal is also applied) the diode 62 conducts heavily, and the quarter wavelength section appears more nearly matched than before. Accordingly, there is a substantial R.F. power output from the main line 54. The output power $P_b$ corresponding to an input power of 2 pi may be, for example, ten or more times greater than the output power corresponding to an input of pi.

The operation of the expander may be improved by selecting a diode 62 which has a Zener breakdown voltage correlated both with the applied bias and the amplitude of the R.F. voltage input. Apparently, if the back bias is about midway between the Zener breakdown and zero bias, and the peak to peak R.F. voltage amplitude for an R.F. input of power pi is about one-half of the Zener breakdown voltage, an improved effect is obtained. The effect is believed due to the diodes being driven into conduction on both swings of the R.F. voltage when a signal of power 2 pi is applied.

Although the phase of the output of the main transmission line 54 differs from the phase of the information input signal, this presents no serious problem. As may be seen in the graph of FIGURE 4, the vector resultant of the control signal 94 and the binary "zero" information signal 90 lies in the first quadrant. A locking signal in either the first or fourth quadrants, I or IV, will cause oscillations to build up in a PLO in phase "zero" because of the PLO characteristics. In like manner, a locking signal in the second or third quadrants, II or III will cause oscillations to build up in phase "one" (or $\pi$), again because of the PLO characteristics.

Figure 6:
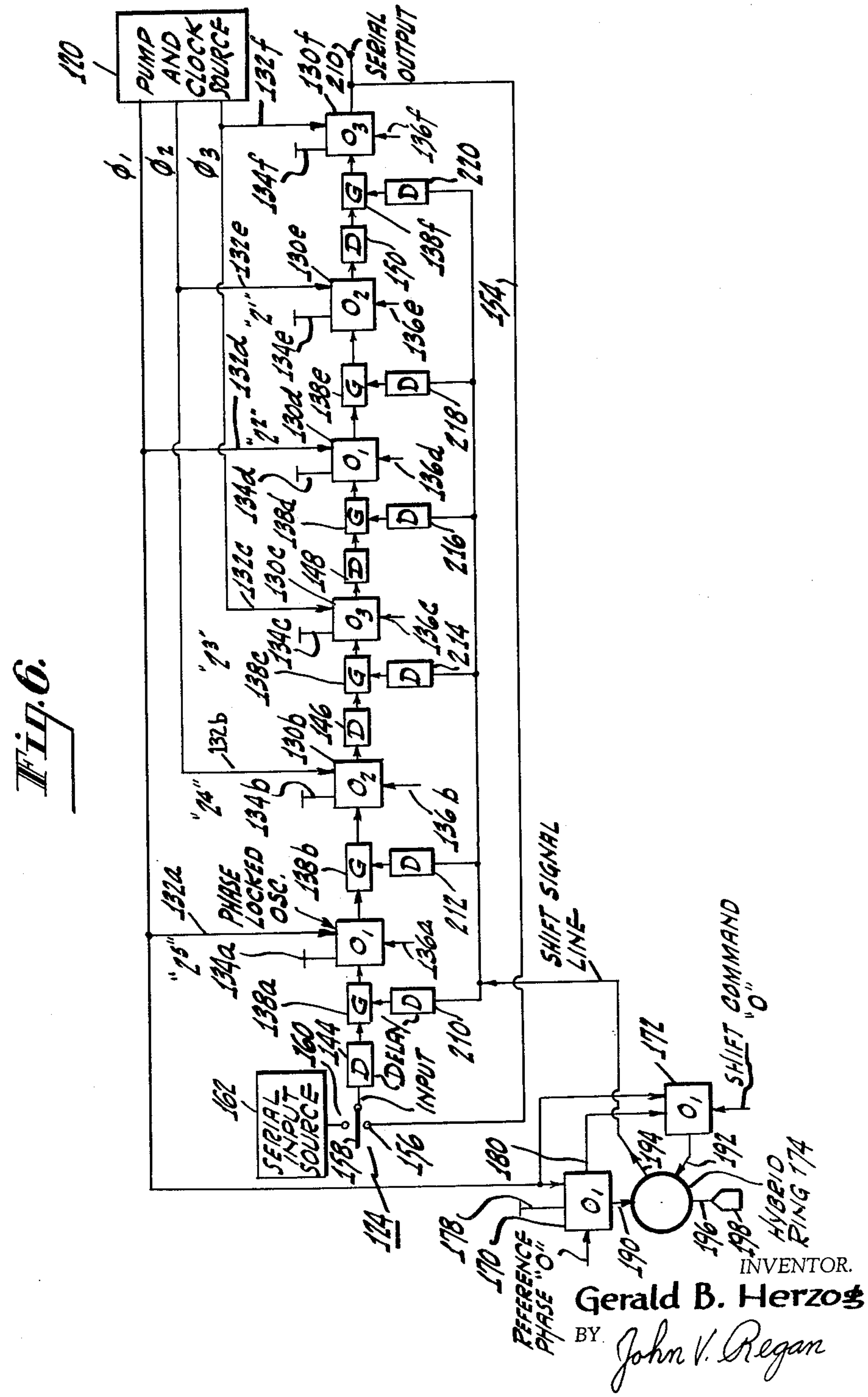
FIGURE 6 is a block diagram of a shift circuit according to the invention.

FIGURE 6 is a block diagram of a six stage shift circuit according to the invention. Reading from left-to-right in the drawing, the six stages may store the binary digits $2^5$ . . . $2^0$, respectively, and each stage includes a PLO 130*a* . . . 130*f*, respectively, energized over a line 123*a* . . . 132*f* from a pump and clock source 120. The first and fourth PLO's 130*a* and 130*d* are clocked by the $\phi_1$ output of the pump and the clock 120; the second and fourth PLO's 130*b* and 130*e* are clocked by the $\phi_2$ output; and the third and sixth PLO's 130*c* and 130*f* are clocked by the $\phi_3$ output. In FIGURE 6 each PLO is labeled "O" followed by a numerical subscript corresponding to the pump and clock source 120 output from which it is clocked. Also in FIGURE 6, gates are labeled "G," and delay means are labeled "D."

The PLO's may be constructed of strip transmission line and may be of the type illustrated and described in the copending application of Fred Sterzer for "Information Handling Devices," Serial No. 787,878, filed January 20, 1959, and assigned to the same assignee as the present invention. Each of the PLO's 130*a* . . . 130*f* has a reflecting stub 134*a* . . . 134*f*, respectively, which may be a shorted delay line of such length that it reflects to its associated PLO a locking signal of the same phase that the PLO had previous to being clocked off. Thus, information may be stored in a PLO. Input signals may be applied to the PLO's 130*a* . . . 130*f* in parallel over lines 136*a* . . . 136*f*, and such signals may be used to reset the PLO's or to read information into the PLO's in parallel. Stored information also may be read out from the PLO's in parallel over these same lines 136*a* . . . 136*f*. Information may be read serially into the PLO's 130*a* . . . 130*f* through gates 138*a*, 138*f* in a manner to be described more fully hereinafter.

The serial input at the carrier frequency to the first PLO 130*a* is fed through a switch 124 to a delay means 144 and suitably delayed therein. The output of the delay means 144 is connected to a normally closed R.F. gate 138*a*. This gate 138*a* and the other gates 138*b* . . . 138*f* are preferably expander gates of the general type illustrated in FIGURE 3 and described hereinabove. The output of the first gate 138*a* is connected to the first PLO 130*a*. The second gate 138*b* is connected directly between the first and second PLO's 130*a*, 130*b*, respectively. The output of the second PLO 130*b* is coupled to the third gate 138*c* through a delay means 146. The output of this third gate 138*c* is connected to the third PLO 130*c*. The series combination of a delay means 148 and the fourth gate 138*d* is connected between the output of the third PLO 130*c* and the input to the fourth PLO 130*d*, the output of the fourth PLO 130*d* is connected directly to the fifth gate 138*e*, the output of which is connected to the fifth PLO 130*e*. The outout of the fifth PLO 130*e* is fed through a delay means 150 to the sixth gate 138*f*. The output of this gate 138*f* is coupled to the sixth PLO 130*f*.

The output of the sixth PLO 130*f* is fed over a line 154 to a terminal 156 of the switch 124 and provides the serial input to the first PLO 130*a* when the movable switch arm 158 is in the downward position in contact with the terminal 156. Under this condition, the shift circuit operates as a close-ended or circulating shift register. Assuming that a single binary one is stored in the shift circuit at this time, the shift circuit then operates as a ring counter. Information may also be entered serially into the shift circuit from a serial input source 162 by moving the switch arm 158 in the upward position into contact with a terminal 160. The output of the serial input source 162 is connected to latter terminal 160. The input source 162 may be, for example, a PLO logic circuit. The particular construction of the switch 124 is illustrative only; any suitable switch, such as an electronic device, may be used.

The gates 138*a* . . . 138*f* are normally closed; that is to say, they allow little or no signal to pass therethrough. When the gates 138*a* . . . 138*f* are of the expander type described previously, a greatly attenuated signal may appear at the output of a closed gate. However, this attenuated signal is of insufficient magnitude to overcome the reflected locking signal provided by the reflecting stub of the following PLO, and therefore is ineffective to switch that PLO. The gates 138*a* . . . 138*f* provide a signal output of switching amplitude only in the presence of a control or shift signal.

Circuit means for providing the shift signal is illustrated in the lower left-hand portion of FIGURE 6 and comprises two PLO's 170, 172 and a hybrid junction, illustrated as a hybrid ring 174. Both PLO's 170, 172 in the shift signal circuit are clocked by the $\phi_1$ output of the pump and clock source 120 and operate in synchronism with the first and fourth PLO's 130*a* and 130*d* of the shift circuit. The PLO 170 has associated therewith a reflecting stub 178 of the type described heretofore and always oscillates, when clocked "on," in phase "0" corresponding to a binary "zero." A small amplitude locking signal of phase "0" may be applied to the PLO 170 from a reference source (not shown) to initially determine the phase of oscillation. Thereafter, the reflecting stub 178 assures that oscillations in this PLO 170 are always of phase "0." A portion of the output of this PLO 170 is fed over line 180 to the other PLO 172. This line 180 is of such length that a locking signal of phase "1" is applied to the second PLO 172.

Outputs of the PLO's 170, 172 are fed to two arms 190, 192, respectively, of the hybird ring 174. The hybrid ring 174 has a mean circumference of $\frac{3}{2}\lambda$ where $\lambda$ is a wavelength in the transmission line at the carrier operating frequency. The input arms 190, 192 are spaced $\lambda/2$ apart at the circumference of the ring 174. An output arm 194 is connected to the ring 174 at a point equidistant from the arms 190, 192, that is to say, $\lambda/4$ from each of the arms 190, 192. The ring 174 has a fourth arm 196 which is $\lambda/4$ from the arm 192 and $\frac{3}{4}\lambda$ from the other input arm 190. The arm 196 has an absorptive termination 198.

The outputs of the PLO's 170, 172 normally arrive at the arms 190, 192, respectively, 180° out of phase. These PLO outputs cancel at the output arm 194 and are absorbed by the termination 198 because of the properties of the hybrid ring 174. To shift information in the shift circuit upon command, a signal of phase "0" is fed to the PLO 172 a short time prior to the energizing clock signal from the pump and clock source 120. This signal has an amplitude greater than that of the locking signal from the other PLO 170 and causes the PLO 172 to oscillate in phase "zero" when the PLO 172 is clocked on. Under these conditions the signals arriving at arms 190 and 192 of the hybrid ring 174 are in phase and add almost in their entirety in the output arm 194. The reference signal to the PLO 170 also may be a signal of phase "1," in which case the locking signal applied over line 180 locks the other PLO 172 in phase "0." Under these circumstances, a shift command signal of phase "0" is required to provide an output from arm 194 of the hybrid ring 174.

The output from arm 194, termed hereinafter "shift signal" is applied to the various gates 138*a* . . . 138*f* through delay means 210 . . . 220, respectively. These delay means 210 . . . 220 are necessary because the PLO's 130*a* . . . 130*f* are clocked out of phase. The delays 210 . . . 220 not only provide the proper time delay for the shift signal, but also assure that the shift signal for controlling the gates 138*a* . . . 138*f* arrives at the gates 90° out of phase with the information signals from the next preceding PLO stages. In actualiy, and as will be described more fully hereinafter, the second and fifth delays 212, 218, respectively, provide only the 90° phase differential and do not otherwise delay the shift signal.

The clocking signals $\phi_1$, $\phi_2$, and $\phi_3$ may be modulated pump signals of the type illustrated in FIGURE 2, in which case the PLO's oscillate only when energized by the pump. In this event, the energizing lines 132*a* . . . 132*f* are single channel lines. As is known however, the PLO's also may be clocked by applying positive and negative D.-C. pulses alternately to the PLO's in the presence of continuously applied pump signals. When the variable reactance elements of the PLO's are variable capacitance diodes, for example, the PLO's will oscillate when energized by the pump if suitable bias is provided for the diodes. The parameters of a PLO may be selected so that a positive D.-C. pulse must be applied to a diode to provide the proper bias for sustaining parametric oscillations. A negative D.-C. pulse applied to the diode biases the diode out of its operating region and parametric oscillations are not then sustained. The lines 132*a* . . . 132*f* are, in this event, double channel lines having one channel for pump signals and one channel for the D.-C. pulses. Both of these techniques for clocking a PLO are known in the art and described in the literature.

A clock period, as the term is used hereinafter, corresponds to one complete cycle of PLO operation. Referring to FIGURE 2 by way of illustration, the time period $t_0$–$t_6$ (or $t_2$–$t_8$, etc.) represents one clock period. The delay means 144 . . . 150 of FIGURE 6 are adjusted to delay the output of the corresponding PLO's one clock period. The delays 210 and 216 delay the shift signal two-thirds of a clock period, and the delays 214 and 220 delay the shift signal for one-third of a clock period. The delays 212 and 218 delay the shift signal only long enough to provide a 90° phase differential of the inputs to corresponding gates 138*b*, 138*e*.

Figure 7:
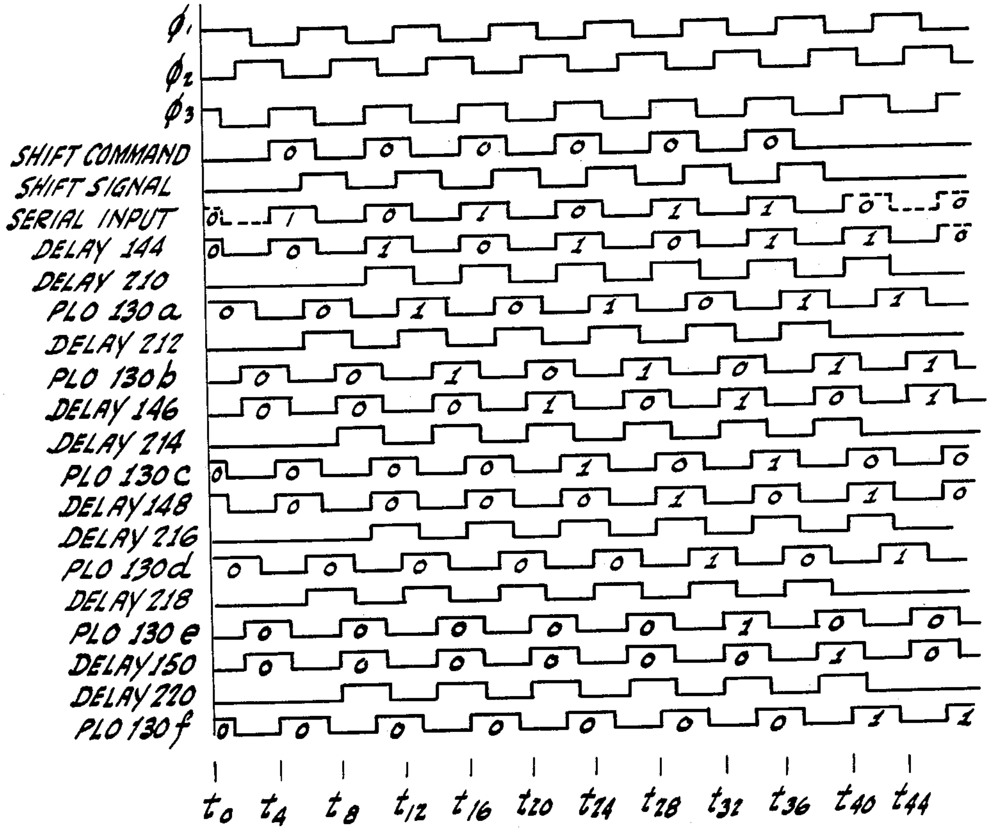
FIGURE 7 is a timing diagram for the FIGURE 6 shift circuit.

The operation of the FIGURE 6 shift circuit as a serial input shift register will now be described with reference to the timing diagram of FIGURE 7. The three phase clocking signals are shown on the top three lines of FIGURE 7. It is to be noted that the periods of energization overlap one another. A PLO oscillates parametrically when the corresponding output $\phi_1$, $\phi_2$, $\phi_3$ of the pump and clock source 120 is high. By way of example, PLO's 130*a* and 130*d* oscillate during the period $t_0$–$t_3$ when the $\phi_1$ energizing signal is high. The PLO oscillations build up in phase with the locking signal provided by the reflecting stub in the absence of a shift signal, and lock in phase with the outputs of the preceding gates only when a shift signal is applied to the corresponding gate.

Assume that the PLO's 130*a* . . . 130*f* of the shift register and PLO 170 of the shift input signal circuit are storing binary "zeros" and that the other PLO 172 of the shift input circuit is storing a binary "one." There is no shift signal present under these conditions and the PLO's 130*a* 130*f* of the shift register always oscillate in phase "zero" when clocked on because of the reflected locking signals from the stubs 134*a* . . . 134*f*. This condition obtains during the period $t_0$ to $t_{10}$. Let it be required to enter the binary number 110101 into the shift register from input source 162. Shift command signals of phase "zero" are applied to the shift input circuit PLO 172 during six consecutive clock periods starting at time $t_4$. However, the PLO's 170, 172 of the shift signal input circuit are clocked by the $\phi_1$ output of the pump and clock source 120. Shift signals are therefore provided at the output arm 194 of the hybrid ring 174 during six consecutive clock periods beginning at time $t_6$. The serial input information to the shift register is applied at the switch 124 during six consecutive clock periods beginning at $t_4$ during the $\phi_3$ clock period. In general, a binary "zero" signal may be applied at the switch 124 at all other times (as indicated by the dashed lines in the row designated "serial input line" of FIGURE 7).

The digits of the binary number to be entered into the register are applied, least significant digit first, to the first delay means 144, which provides a delay of one full clock period. By way of example, the least significant digit "one" is applied at the input of the first delay 144 during the time interval $t_4$–$t_7$ and, after a delay of one clock period therein, is applied as information input to the gate 138*a* during the period $t_{10}$ to $t_{13}$. A large output is applied to the first PLO 130*a* from the gate 138*a* when the delayed shift signal is applied to the gate 138*a* from delay 210. The delay 210 is adjusted so that this large output is present during the "on" period determined by the $\phi_3$ clocking pulse, or more specifically, during the period $t_{10}$ to $t_{13}$. It is to be noted that the trailing end of this large signal overlaps the "on" period of the first PLO 130*a* and causes oscillations to build up therein in phase "one" beginning at time $t_{12}$.

The first shift signal is present at the ouptut arm 194 of hybrid ring 174 during the period $t_6$–$t_9$. Gates 138*b* and 138*e* at the inputs to the second and fifth PLO's 130*b* and 130*e* are opened during this period because the delay devices 212 and 218 provide practically no delay. These PLO's 130*b*, 130*e* lock in phase with the phase of the last previous oscillations of PLO's 130*a*, 130*d*, respectively, because the outputs of the latter PLO's are not delayed. The gates 138*c*, 138*f* at the inputs of the third and sixth PLO's 130*c* and 130*f* are opened during the period $t_8$–$t_{11}$ because the delays 214 and 220 delay the shift signal two-thirds of a clock period. However, the information which was entered into the second and fifth PLO's 130*b*, 130*e* at time $t_6$ is not shifted into the third and sixth PLO's 130*c*, 130*f*, respectively, at $t_8$ because of the full clock period delay provided by the delay means 146, 150, respectively. Gates 138*a* and 138*d* at the inputs of the first and fourth PLO's 130*a*, 130*d* are opened during the time period $t_{10}$–$t_{13}$ in response to the first shift pulse. This shift pulse is delayed two-thirds of a clock period by the delays 210 and 216, respectively.

It is believed unnecessary to describe the entire timing diagram in detail inasmuch as shifting in response to the second, third, fourth, fifth, and sixth shift signals follows the same procedure as that described above with respect to the first shift signal. As may be seen in the timing diagram, the binary number 110101 is stored in the shift register after time $t_{42}$. The last, or sixth, shift signal is applied to the second gate 138*b* during the period $t_{36}$–$t_{39}$, after which period the gate 138*b* remains closed. Consequently, no locking signal is applied to the second PLO 130*b* from the gate 138*b* at time $t_{44}$. However, the reflected signal from the stub 134*b* provides a locking signal for the second PLO 130*b* during this and succeeding "on" periods of the second PLO 130*b*, whereby this PLO continues to store a binary "one."

All of the major components of the shift circuit and the shift signal input circuit may be of strip transmission line construction, in which case the various delays may be suitable lengths of coaxial cable, for example. A hybrid ring, reflecting stub, and PLO input couplers of strip transmission line construction are illustrated and described in the aforementioned Sterzer application.

The pump may be, for example, a klystron oscillator modulated by D.-C. pulses from a clock generator and providing a time-ordered sequence of modulated R.F. outputs $\phi_1$, $\phi_2$ and $\phi_3$ through suitable delays. Alternatively, the pump output may be applied continuously to the PLO's 130*a* . . . 130*f*, 170 and 172, and alternate positive and negative D.-C. pulses may be applied in clocked sequence through delays to the variable reactance elements of the PLO's.

The shift circuit may be operated in any of the conventional modes as follows.

(1) Serial input-parallel output: The output of the serial input source 162 is connected to the input of the first delay means 144. Output signals are derived at output lines 136*a* . . . 136*f*.

(2) Serial input-serial output: Input signals are applied to the shift circuit as in (1) above. Output signals are derived at output terminal 210.

(3) Parallel input-serial output: Input signals are applied in parallel to the PLO's 130*a* . . . 130*f* over lines 136*a* . . . 136*f*, respectively. Serial output is derived at output terminal 210.

(4) Circulating shift register: The shift circuit is operated as a circulating, or close-ended, shift register by connecting the output of the sixth PLO 130*f* to the input of the first delay means 144.

(5) Ring counter: A single binary "one" is first entered into the shift circuit from either the serial input source 162 or by way of one of the lines 136*a* . . . 136*f*. The output of the sixth PLO 130*f* is connected to the input of the first delay means 144.

In summary, what has been shown and described is a novel means for gating R.F. information signals expressed in phase script notation, and a versatile shift circuit for a clocked carrier system, which shift circuit may employ said novel gating means.

What is claimed is:

1. A gate for R.F. signals of one phase and a counter phase at the same frequency comprising, in combination: an expander device including a transmission line section and a diode terminating said section, said R.F. signals being applied at the input of said expander device, and means for applying selectively at said input a control signal of said frequency and having a phase between said one phase and said counter phase.

2. A gate for R.F. signals of 0° phase and 180° phase at the same frequency comprising an expander device including a transmission line section and a diode terminating said section, said R.F. signals being applied at the input of said expander device, and means for applying selectively at said input an R.F. control signal of said frequency and of ±90° phase.

3. The combination comprising a device for adding alternating current signals, means for applying to said device alternating current information signals of one phase and a counter phase at the same frequency, a phase at a time means for applying selectively to said device alternating current control signals of said frequency and having a phase equally displaced from said one phase and said counter phase, a threshold gate means connected to the output of said device, and means for adjusting the threshold of said gate to be greater than the amplitude of said information signals and less than the combined amplitude of an information signal and a control signal.

4. The combination comprising a main transmission line for receiving R.F. signals of one phase and a counter phase at the same frequency a phase at a time, a phase at a time a transmission line section connected effectively in shunt with said main transmission line and having effectively an odd number of quarter wavelengths at said frequency, a diode terminating said line section, and means for applying to said main transmission line a control signal of said frequency and of a phase displaced substantially equally from said one phase and said counter phase.

5. A gate for R.F. signals of one phase and a counter phase at the same frequency comprising: a main transmission line for receiving said R.F. signals, a transmission line section connected effectively in shunt with said main transmission line and having effectively an odd number of quarter wavelengths at said frequency, a diode terminating said line section, means for applying a D.-C. bias voltage to said diode, and means for applying to said main transmission line a control signal of said frequency and of a phase intermediate said one phase and said counter phase.

6. A gate for R.F. information signals of one phase and a counter phase at the same frequency comprising a main transmission line connected to receive said information signals, means for applying to said main transmission line a control signal of said frequency and having a phase intermediate said one phase and said counter phase, a transmission line section connected effectively in shunt with said main transmission line and having effectively an odd number of quarter wavelengths as said frequency, and a voltage-sensitive, nonlinear impedance element terminating said line section.

7. A gate for R.F. information signals of one phase and a counter phase at the same frequency comprising a main transmission line connected to receive said information signals, means for applying to said main transmission line a control signal of said frequency and having a phase intermediate said one phase and said counter phase, a transmission line section connected effectively in shunt with said main transmission line and having effectively an odd number of quarter wavelengths at said frequency, a voltage-sensitive, nonlinear impedance element terminating said line section, and means for applying to said element a D.-C. bias voltage of such value that said line section appears greatly mismatched in response to an information signal in the absence of a control signal.

8. The combination comprising a plurality of parametric oscillators connected in cascade and each having two distinct and opposite phases of oscillation at the same frequency, a three phase clock source for selectively energizing said oscillators periodically, a plurality of gates each connected between different adjacent oscillators, means for generating a control signal on command, and separate delay means each connected between a different one of said gates and the output of said generating means.

9. The combination comprising a plurality of parametric oscillators connected in cascade and each having two distinct and opposite phases of oscillation at the same frequency, a three phase-clock source for selectively energizing said oscillators periodically, a plurality of gates each connected between different adjacent oscillators, means for generating a control signal on command, separate delay means each connected between a different one of said gates and the output of said generating means, and means connecting the output of the last cascaded one of said oscillators to the input of the first cascaded one of said oscillators.

10. The combination comprising a plurality of parametric oscillators connected in cascade and each having two distinct and opposite phases of oscillation at the same frequency, a three phase-clock source for selectively energizing said oscillators periodically, a plurality of gates each connected between different adjacent oscillators, means for generating a control signal on command, separate delay means each connected between a different one of said gates and the output of said generating means, and means for applying input signals from an external source to at least one of said oscillators.

11. A shift circuit comprising a plurality of parametric phase locked oscillators each having two distinct phases of oscillation at the same frequency, a plurality of gate means coupling said oscillators in cascade, a three phase clock source for clocking said oscillators "on" and "off" periodically in a predetermined sequence, separate delay feedback means connected in each oscillator circuit, shift signal generating means, and means for delaying said shift signal different amounts for application as a control signal to each of said gate means in synchronism with the oscillator output to the corresponding gate means.

12. A shift circuit comprising a plurality of parametric phase locked oscillators each having two distinct phases of oscillations at the same frequency, a plurality of gate means coupling said oscillators in cascade, a three phase clock source for clocking said oscillators "on" and "off" periodically in a predetermined sequence, separate delay feedback means connected in each oscillator circuit, shift signal generating means, means for delaying said shift signal different amounts for application as a control signal to each of said gate means in synchronism with the oscillator output to the corresponding gate means, and means for applying input signals of said frequency from an external source to at least one of said oscillators.

13. A shift circuit comprising a plurality of parametric phase locked oscillators each having two distinct phases of oscillations at the same frequency, a plurality of gate means coupling said oscillators in cascade, a three phase clock source for clocking said oscillators "on" and "off" periodically in a predetermined sequence, separate delay feedback means connected in each oscillator circuit, shift signal generating means, means for delaying said shift signal different amounts for application as a control signal to said gate means in synchronism with the output of said clock source, and means connecting the output of the last cascaded one of said oscillators to the input of the first cascaded one of said oscillators.

14. A shift circuit comprising a plurality of phase locked oscillators each having two opposite phases of oscillation at the same frequency, translating means including separate expander gates connecting said oscillators in cascade, a three phase clock source for clocking said oscillators "on" and "off" in a predetermined sequence, means for generating a control signal of said frequency on command, and separate delay means respectively for said gates for applying said control signal to said gates during a portion of the "on" period of the next succeeding one of said oscillators.

15. A shift circuit comprising a plurality of phase locked oscillators each having two opposite phases of oscillation at the same frequency, translating means including separate expander gates connecting said oscillators is cascade, a three phase clock source for clocking said oscillators "on" and "off" in a predetermined sequence, means for generating a control signal of said frequency on command, separate delay means respectively for said gates for applying said control signal to said gates during a portion of the "on" period of the next succeeding one of said oscillators, and separate delay feedback means connected in each oscillator circuit.

16. A shift circuit comprising a plurality of phase locked oscillators each having two opposite phases of oscillation at the same frequency, translating means including separate expander gates connecting said oscillators in cascade, a three phase clock source for clocking said oscillators "on" and "off" in a predetermined sequence, means for generating a control signal of said frequency on command, separate delay means respectively for said gates for applying said control signal to said gates during a portion of the "on" period of the next succeeding one of said oscillators, and means for applying input signals of said frequency from an external source to at least one of said oscillators.

17. A shift circuit comprising: a plurality of parametric phase locked oscillators each having two opposite phases of parametric oscillation at the same frequency; translating means including separate expander gates connecting said oscillators in cascade, each of said gates having first and second transmission line sections merged into a main transmission line, the output of one of said oscillators being applied to said first one of said sections, the output of said main transmission line being coupled to the next succeeding cascaded one of said oscillators, a transmission line section effectively in shunt with said main transmission line and having effectively an odd number of quarter wavelengths at said frequency, and a diode terminating said shunt line section; means for generating a shift signal of said frequency on command; and a plurality of delay means each applying said shift signal to said second input section of a different one of said gates such that the inputs at the first and second input sections of each of said gates arrive at the corresponding said main line 90° out of phase with each other.

18. A shift circuit comprising: a plurality of parametric phase locked oscillators each having two opposite phases of parametric oscillation at the same frequency; translating means including separate expander gates connecting said oscillators in cascade, each of said gates having first and second transmission line sections merged into a main transmission line, the output of one of said oscillators being applied to said first one of said sections, the output of said main transmission line being coupled to the next succeeding one of said oscillators, a transmission line section effectively in shunt with said main transmission line and having effectively an odd number of quarter wavelengths at said frequency, and a diode terminating said shunt line section; means for generating a shift signal of said frequency on command; a plurality of delay means each applying said shift signal to said second input section of a different one of said gates such that the inputs at the first and second input sections of each of said gates arrive at the corresponding said main line 90° out of phase with each other, and means for applying input signals of said frequency from an external source to at least one of said oscillators.

References Cited in the file of this patent

UNITED STATES PATENTS 2,901,729 Broadhead ____________ Aug. 25, 1959

UNITED STATES PATENT OFFICE
CERTIFICATE OF CORRECTION

Patent No. 3,023,319 February 27, 1962

Gerald Bernard Herzog

It is hereby certified that error appears in the above numbered patent requiring correction and that the said Letters Patent should read as corrected below.

Column 6, line 32, for "174," read -- 174. --; column 7, line 14, for "actualiy" read -- actuality --; column 9, line 68, strike out -- a phase at a time --, second occurrence.

Signed and sealed this 19th day of June 1962.

(SEAL)
Attest:

ERNEST W. SWIDER
Attesting Officer

DAVID L. LADD
Commissioner of Patents